United States Patent
Chen et al.

(10) Patent No.: US 12,112,184 B2
(45) Date of Patent: Oct. 8, 2024

(54) VALUE-ADDED CONTENT PROVIDING METHOD AND COMPUTER SYSTEM THEREOF

(71) Applicants: Inventec (Pudong) Technology Corp., Shanghai (CN); Inventec Corporation, Taipei (TW)

(72) Inventors: Hsueh-Liang Chen, Taipei (TW); Chen-Chou Huang, Taipei (TW); Yan-Yue Yin, Taipei (TW)

(73) Assignees: Inventec (Pudong) Technology Corp., Shanghai (CN); Inventec Corporation, Taipei (TW)

( * ) Notice: Subject to any disclaimer, the term of this patent is extended or adjusted under 35 U.S.C. 154(b) by 0 days.

(21) Appl. No.: 18/205,562

(22) Filed: Jun. 4, 2023

(65) Prior Publication Data

US 2023/0393873 A1    Dec. 7, 2023

(30) Foreign Application Priority Data

Jun. 7, 2022   (CN) .......................... 202210640278.X

(51) Int. Cl.
*G06F 3/048* (2013.01)
*G06F 3/0481* (2022.01)
*G06F 3/04842* (2022.01)
*G06F 9/451* (2018.01)
*G06F 40/20* (2020.01)

(52) U.S. Cl.
CPC ............ *G06F 9/453* (2018.02); *G06F 3/0481* (2013.01); *G06F 3/04842* (2013.01); *G06F 40/20* (2020.01)

(58) Field of Classification Search
CPC ........ G06F 9/453; G06F 40/20; G06F 3/0481; G06F 3/04842
See application file for complete search history.

(56) References Cited

U.S. PATENT DOCUMENTS

| | | | | |
|---|---|---|---|---|
| 7,617,090 | B2 * | 11/2009 | Wang | G06F 16/9535 |
| | | | | 704/270.1 |
| 8,817,292 | B1 * | 8/2014 | Rodriguez | G06F 3/1211 |
| | | | | 358/1.14 |
| 10,044,871 | B2 * | 8/2018 | Bargetzi | H04L 12/1818 |
| 10,380,120 | B2 * | 8/2019 | Fink | G06F 16/24578 |
| 10,409,442 | B1 * | 9/2019 | Gurung | G06F 3/0481 |
| 10,810,357 | B1 * | 10/2020 | Tsypliaev | G06F 3/0484 |
| 11,262,900 | B1 * | 3/2022 | Burkhead | B64D 43/00 |
| 2004/0243537 | A1 * | 12/2004 | Wang | G06F 16/9535 |
| 2009/0313220 | A1 * | 12/2009 | Best | G06F 16/3338 |

(Continued)

OTHER PUBLICATIONS

IBM, Minimising distraction from pop-up windows, 2007, IP, 2 pages. (Year: 2007).*

(Continued)

*Primary Examiner* — Linh K Pham
(74) *Attorney, Agent, or Firm* — Winston Hsu

(57) ABSTRACT

A value-added content providing method for a computer system includes receiving an input message indicating to present a pop-up window in a display area of the computer system; obtaining a content area in the display area according to the input message; analyzing the content area to generate an analysis content; and providing and displaying a value-added content in the pop-up window according to the analysis content.

8 Claims, 5 Drawing Sheets

(56) References Cited

U.S. PATENT DOCUMENTS

| | | | | |
|---|---|---|---|---|
| 2012/0072867 | A1* | 3/2012 | Schlegel | G06F 3/0482 |
| | | | | 715/808 |
| 2013/0041874 | A1* | 2/2013 | Dohm | G06F 16/958 |
| | | | | 707/E17.127 |
| 2014/0195916 | A1* | 7/2014 | Kwon | G06F 3/0484 |
| | | | | 715/722 |
| 2015/0012520 | A1* | 1/2015 | An | G06F 3/0488 |
| | | | | 707/711 |
| 2015/0019569 | A1* | 1/2015 | Parker | G06F 16/3344 |
| | | | | 707/748 |
| 2016/0196055 | A1* | 7/2016 | Park | G06F 3/04817 |
| | | | | 715/780 |
| 2018/0181261 | A1* | 6/2018 | Saurabh | G06F 9/451 |
| 2020/0134933 | A1* | 4/2020 | Covington | G06Q 50/40 |
| 2021/0311688 | A1* | 10/2021 | Isselhardt | G06F 30/12 |
| 2022/0230477 | A1* | 7/2022 | Covington | G07C 5/0825 |

OTHER PUBLICATIONS

Disclosed Without Attribution, Automatically protect visual focus from being interrupted by popup windows, 2017, IP, 5 pages. (Year: 2017).*

* cited by examiner

VALUE-ADDED CONTENT PROVIDING METHOD AND COMPUTER SYSTEM THEREOF

BACKGROUND OF THE INVENTION

1. Field of the Invention

The present invention relates to a value-added content providing method and a computer system thereof, and more particularly, to a value-added content providing method and a computer system thereof for actively determining user intentions.

2. Description of the Prior Art

To reduce the learning curve for users to learn how to use software, developers usually include "prompts" that guide users on how to use specific functions. However, the text commentary presented by a prompt in a software may only cover basic functions and may not be clear. In addition, since the software cannot determine the user's intention, the software may not be able to provide value-added content that would help improve the user's learning experience.

Under this circumstance, how to accurately determine user's intentions and provide suitable value-added content to users has become one of the goals of the industry.

SUMMARY OF THE INVENTION

The present invention is to provide a value-added content providing method and the computer system thereof to solve the above problems.

The present invention provides a value-added content providing method, for a computer system, including receiving an input message indicating to present a pop-up window in a display area of the computer system; obtaining a content area in the display area according to the input message; analyzing the content area to generate an analysis content; and providing and displaying a value-added content in the pop-up window according to the analysis content.

The present invention provides a computer system, including a display device; an input device; a processor, coupled to the display device and the input device; and a memory, coupled to the processor, configured to store a program code for instructing the processor to execute a value-added content providing method, and the value-added content providing method comprises receiving an input message indicating to present a pop-up window in a display area of the computer system; obtaining a content area in the display area according to the input message; analyzing the content area to generate an analysis content; and providing and displaying a value-added content in the pop-up window according to the analysis content.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, hardware manufacturers may refer to a component by different names. This document does not intend to distinguish between components that differ in name but not function. In the following description and in the claims, the terms "include" and "comprise" are utilized in an open-ended fashion, and thus should be interpreted to mean "include, but not limited to". Also, the term "couple" is intended to mean either an indirect or direct electrical connection. Accordingly, if one device is coupled to another device, that connection may be through a direct electrical connection, or through an indirect electrical connection via other devices and connections.

Figure 1:
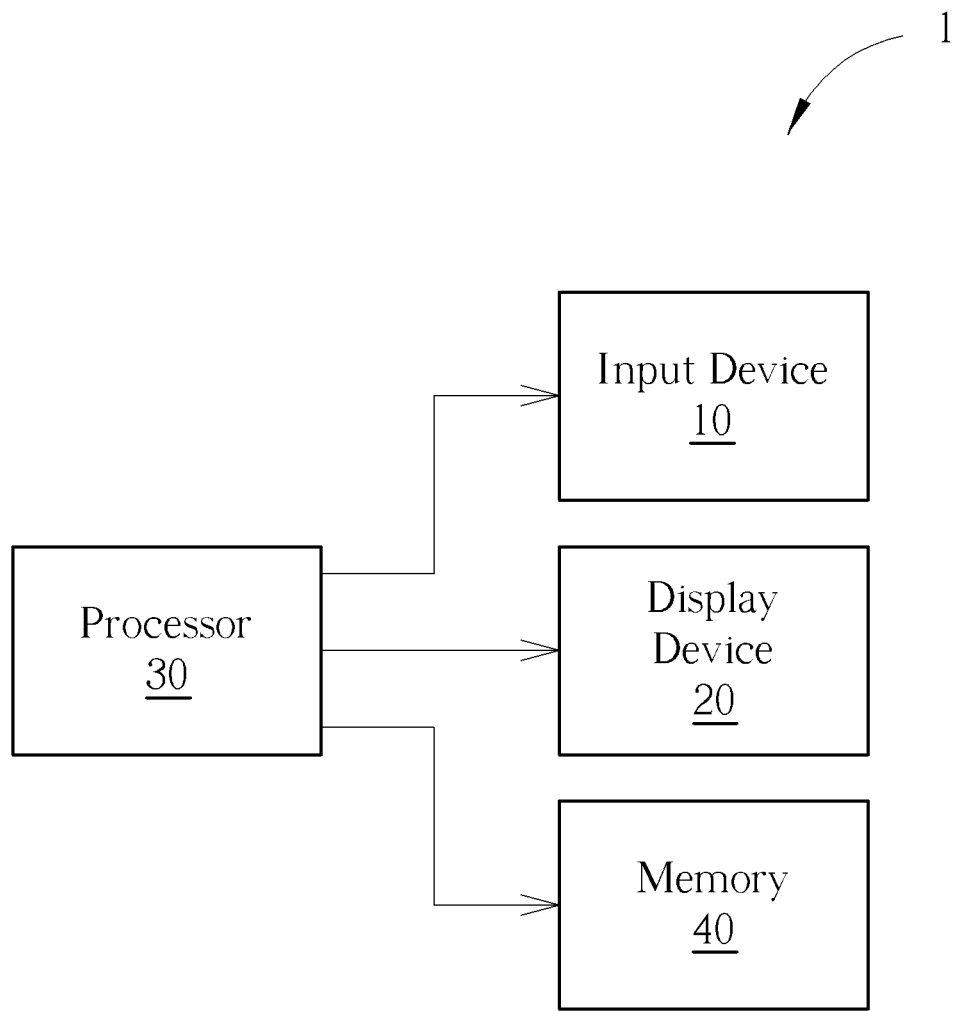
FIG. 1 is a schematic diagram of a computer system according to an embodiment of the present invention.

Please refer to FIG. 1. FIG. 1 is a schematic diagram of a computer system 1 according to an embodiment of the present invention. The computer system 1 includes an input device 10, a display device 20, a processor 30 and a memory 40. The input device 10, the display device 20 and the memory 40 are coupled to the processor 30, which are used to represent basic components of the computer system 1, but not limited thereto. The memory 40 stores a program code for instructing the processor 30 to execute a value-added content providing method, so that the display device 20 may display a value-added content according to user's intentions. Users may use the software according to the value-added content and get a good learning curve. It should be noted that the computer system 1 represents the necessary components required to the value-added content providing method, and its basic structure is well known in the art, and will not be narrated for brevity. Those skilled in the art may add other components as needed, such as the motherboard, the power supply, the cable, the microphone, the speaker, etc., but not limited thereto, or may implement the computer system 1 with appropriate devices or equipment. For example, the input device 10 may include a mouse, a keyboard or implemented by voice recognition via a microphone, etc.

Figure 2:
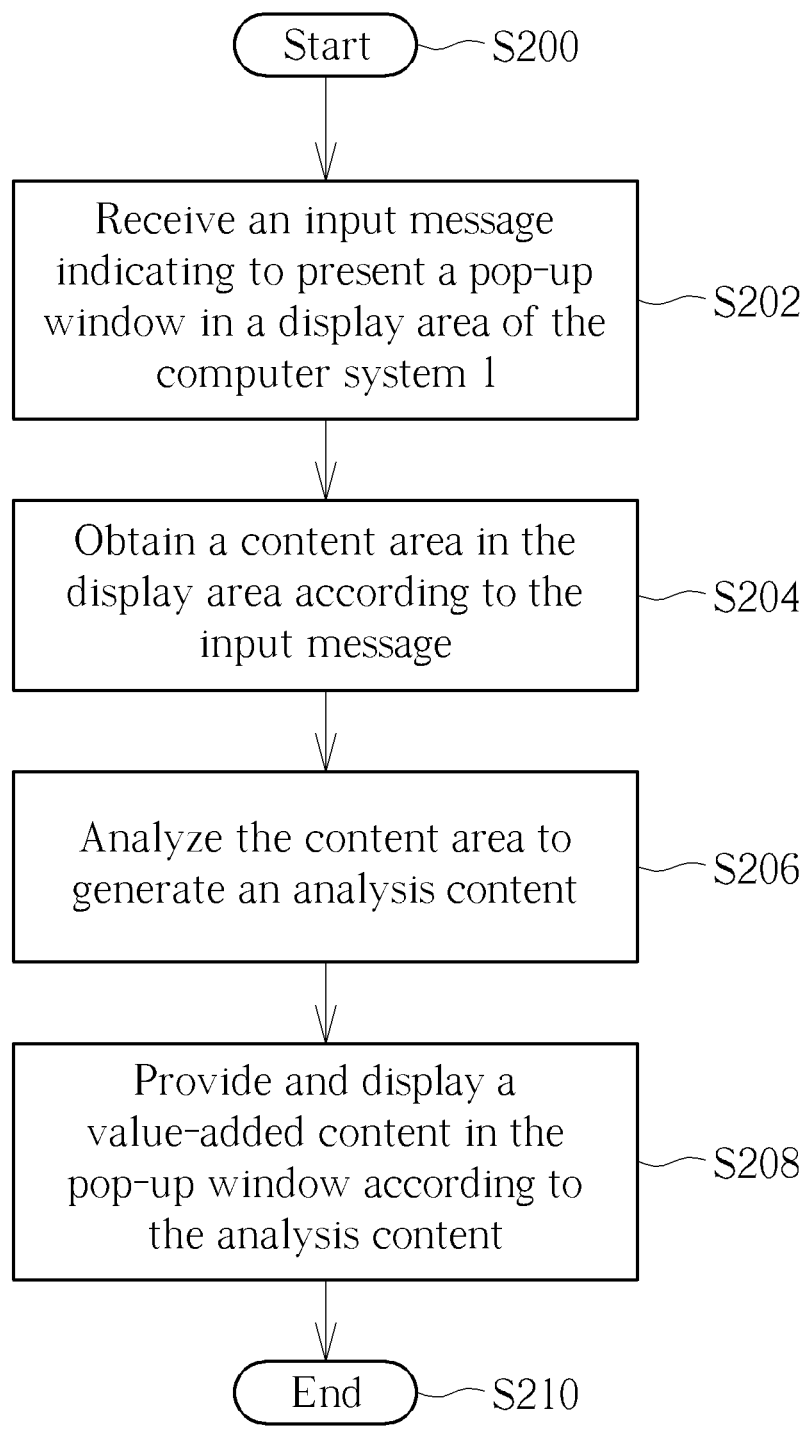
FIG. 2 is a flowchart of the value-added content providing method according to an embodiment of the present invention.

The value-added content providing method of the computer system 1 may be summarized as a process 2, as shown in FIG. 2. The process 2 includes the following steps:

Step S200: Start.

Step S202: Receive an input message indicating to present a pop-up window in a display area of the computer system 1.

Step S204: Obtain a content area in the display area according to the input message.

Step S206: Analyze the content area to generate an analysis content.

Step S208: Provide and display a value-added content in the pop-up window according to the analysis content.

Step S210: End.

According to the process 2, in the step S202, when the user uses the computer system 1 to operate a software, the user interface of the software may appear in a display area of the display device 20. The user may input an input message through the input device 10 to select any position of the user interface of the software. The computer system 1 may present a pop-up window according to the position selected by the input message input by the input device 10. For example, the user moves a mouse cursor in the display area with the mouse, and selects any position of the user interface of the software in the display area. The computer system 1 may present the pop-up window according to the position selected by the mouse cursor. It should be noted that the user may also directly select any position of the user interface of the software on the display device 20 through a stylus, but not limited thereto.

Figure 3:
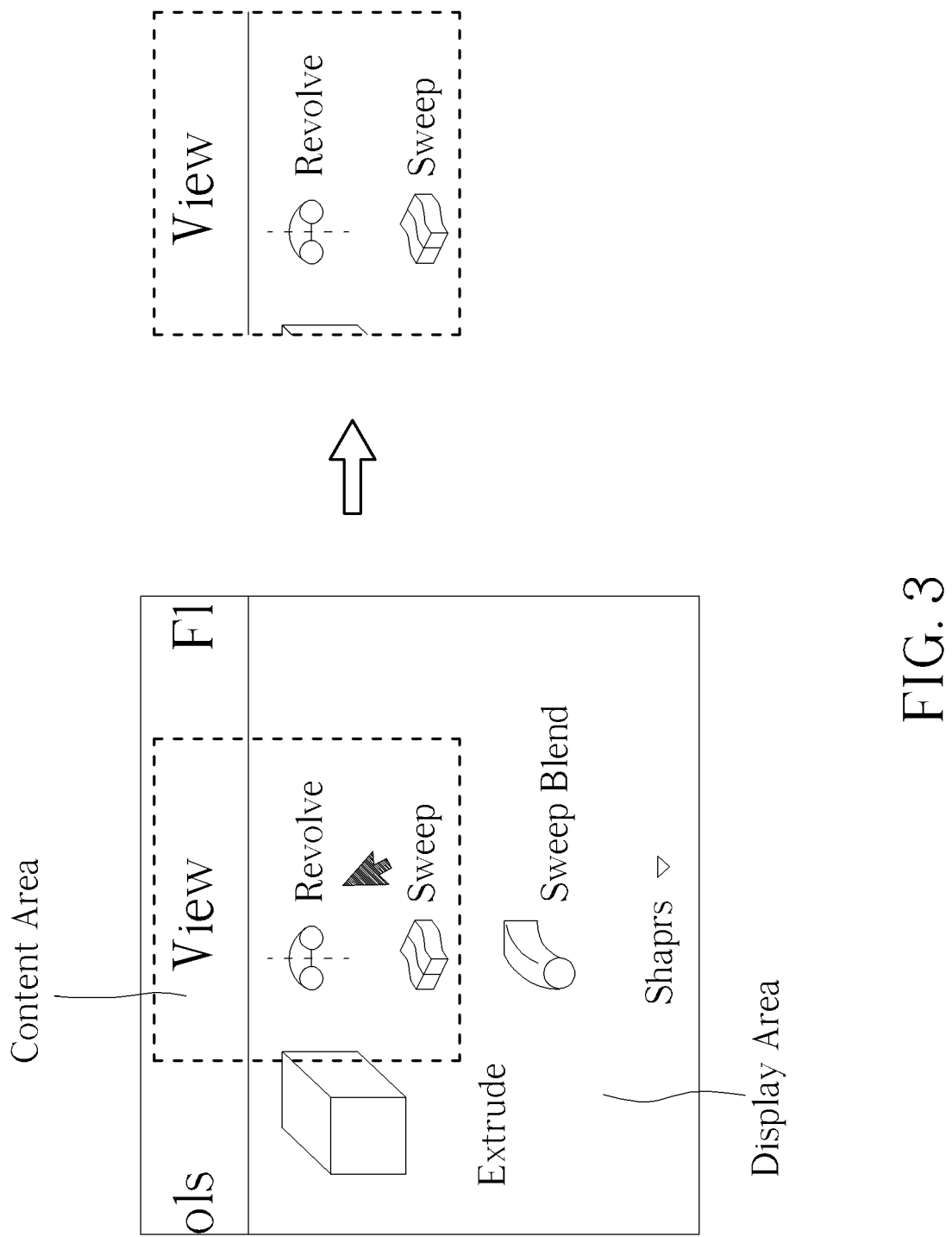
FIG. 3 is a schematic diagram of a relationship between the display area and the content area according to an embodiment of the present invention.

In the step S204, the computer system 1 may obtain a content area in the display area according to the input message. Specifically, please refer to FIG. 3. FIG. 3 is a schematic diagram of a relationship between the display area and the content area according to an embodiment of the present invention. Assuming that the user moves the mouse cursor to a first position of a function Revolve in the display area, the computer system 1 may set the content area centered on the first position when determining that the mouse cursor stays at the first position for a first input time exceeding a first threshold. As shown in FIG. 3, the computer system 1 has captured a rectangular content area centered on the mouse cursor, and the computer system 1 may also capture a circular, other shape or different sizes of the content area, but not limited thereto.

In the step S206, the computer system 1 may analyze the content area to generate an analysis content. Specifically, the content area may include a plurality of text contents and the plurality of images. When the user operates the mouse cursor, a second position where the mouse cursor stays may deviate from the first position that the user intends to select. For example, the mouse cursor in FIG. 3 does not actually stay completely on the first position of the function Revolve. Therefore, the computer system 1 may analyze a plurality of text contents and the plurality of images in the content area to generate the analysis content, instead of only analyzing the specific content designated by the mouse cursor.

Figure 4:
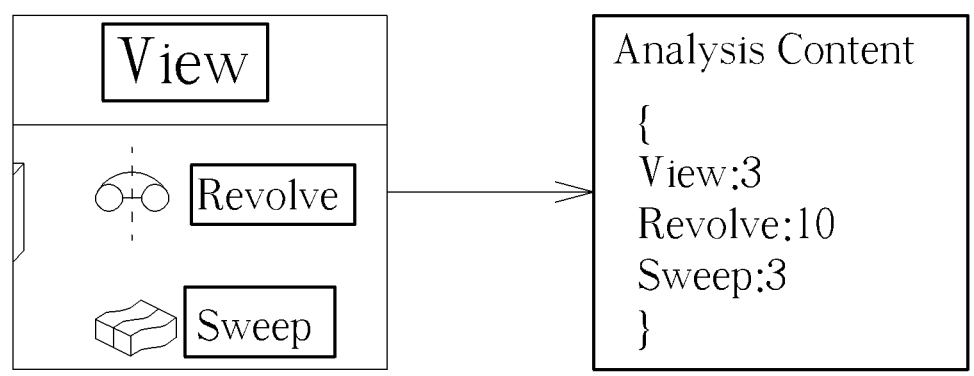
FIG. 4 is a schematic diagram of analyzing the text content according to an embodiment of the present invention.

In an embodiment, please refer to FIG. 4, the computer system 1 may capture a plurality of text contents in the content area. For example, the computer system 1 may use an artificial intelligence software to capture pictures containing text content in the content area, and analyze the text content in the pictures. The computer system 1 may also directly extract the text from a source code file of the software, but not limited thereto. As shown in FIG. 4, a plurality of text contents in the content area include View, Revolve and Sweep, wherein the text content View is separated from the mouse cursor by a first distance, the text content Revolve is separated from the mouse cursor by a second distance, and the text content Sweep is separated from the mouse cursor by a third distance. The computer system 1 may respectively assign a corresponding text weight to the text content View, the text content Revolve and the text content Sweep according to the values of the first distance, the second distance and the third distance. For example, the text weight assigned to the text content Revolve equals 10, and the text weights of the text content View and the text content Sweep equal 3. In this case, the computer system 1 may generate the analysis content according to the text weights corresponding to a plurality of text contents.

Figure 5:
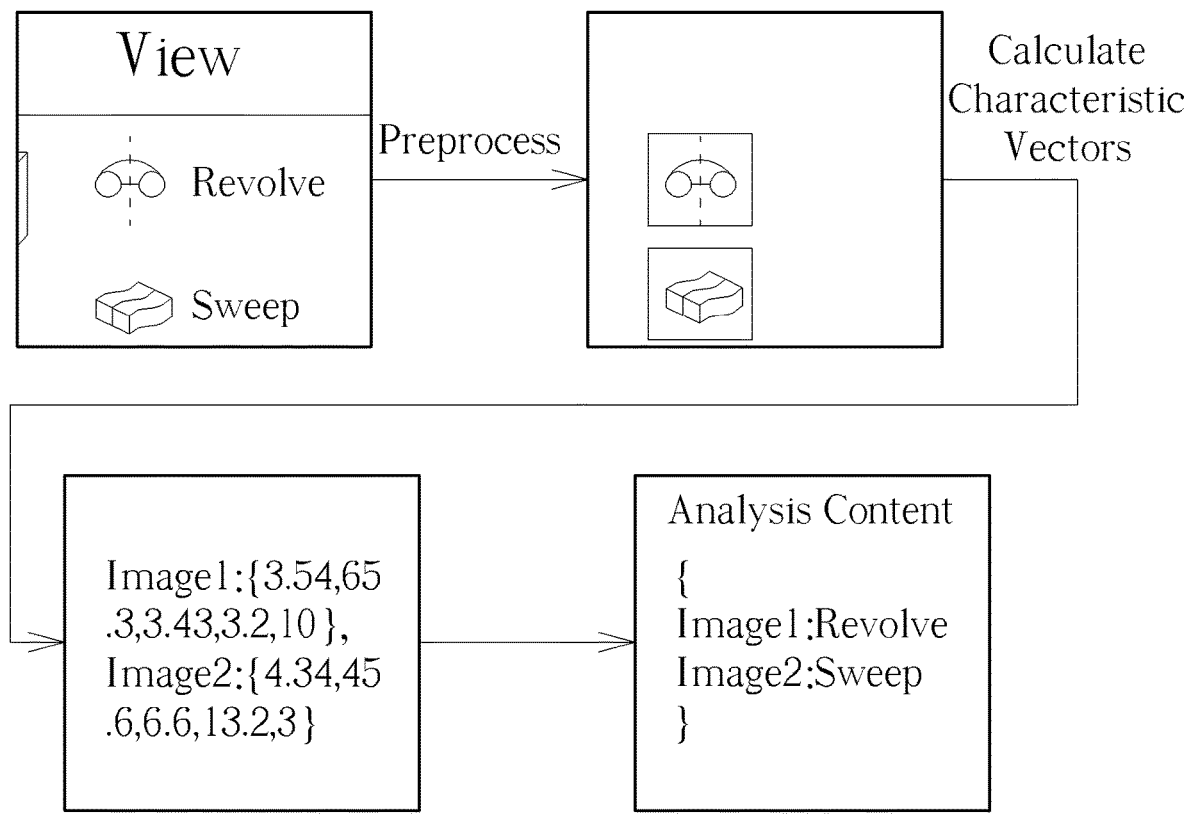
FIG. 5 is a schematic diagram of analyzing the image content according to an embodiment of the present invention.

In another embodiment, please refer to FIG. 5, the computer system 1 may capture a plurality of images in the content area. Specifically, the computer system 1 may preprocess all the contents in the content area, so that the accuracy of the computer system 1 in identifying and capturing the correct plurality of images may be enhanced. For example, the computer system 1 may execute a background removal algorithm on the content area so that only the plurality of images are remained in the content area. The computer system 1 may also execute a graying algorithm and a normalization algorithm on the content area, so that other text contents or background colors in the content area may be removed, and the computer system 1 may accurately capture the plurality of images. For example, in the visible content area in FIG. 5, only two images Image 1 and Image 2 representing the function Revolve and the function Sweep are left after the preprocessing. Furthermore, the computer system 1 may calculate a plurality characteristic vectors corresponding to the plurality of images of the content area, and analyze a plurality characteristic vectors to capture the correct plurality of images. For example, the characteristic vectors of the images Image 1 and Image 2 are respectively {3.54, 65.3, 3.43, 3.2, 10} and {4.34, 45.6, 6.3, 13.2, 3}. After the characteristic vectors are analyzed and compared with a database, it may be known that the image Image 1 represents the function Revolve and the image Image 2 represents the function Sweep. It should be noted that the computer system 1 may also respectively assign the different image weights to the plurality of images according to the distances between the plurality of images and the input position. In this case, the computer system 1 generates the analysis content according to the plurality of images and the corresponding image weights, and the detailed operations may be referred to the above, and will not be repeated here.

In the step S208, the computer system 1 may provide the value-added content and display the value-added content in the pop-up window according to the analysis content. Specifically, the computer system 1 may search a database for the data related to the analysis content, and analyze the analysis content and the relevant data in the database to generate the value-added content, and then display the value-added content in the pop-up window. For example, the database may be stored in the memory 40. After the computer system 1 searches the database according to the analysis content, the computer system 1 obtains a first teaching video of the function Revolve and a second teaching video of the function Sweep, and the computer system 1 may display links of the first teaching video and the second teaching video in the pop-up window. The user may choose the appropriate value-added content to obtain a good learning curve. It should be noted that the database may be a search website or a value-added content platform stored in a cloud, but not limited thereto.

It should be noted that the computer system 1 is an embodiment of the present invention. Those skilled in the art should readily make combinations, modifications and/or alterations on the abovementioned description and examples. The abovementioned description, steps, procedures and/or processes including suggested steps can be realized by means that could be hardware, software, firmware (known as a combination of a hardware device and computer instructions and data that reside as read-only software on the hardware device), an electronic system, or combination thereof. Examples of hardware can include analog, digital and mixed circuits known as microcircuit, microchip, or silicon chip. Examples of the electronic system may include a system on chip (SoC), system in package (SiP), a computer on module (CoM) and the electronic system 1. Any of the abovementioned procedures and examples above may be compiled into program codes or instructions that are stored in the memory 40. The memory 40 may include read-only memory (ROM), flash memory, random access memory (RAM), subscriber identity module (SIM), hard disk, floppy diskette, or CD-ROM/DVD-ROM/BD-ROM, but not limited thereto. The processor 30 may read and execute the program codes or the instructions stored in the memory 40 for realizing the abovementioned functions.

In summary, compared to the prior art, the present invention may accurately determine the user's intentions, and provide the suitable value-added content to the users. In this way, in addition to obtaining the correct value-added content in the pop-up window, the present invention also allows the users to get a good learning curve and increase work efficiency.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A value-added content providing method, for a computer system, comprising:
   receiving an input message indicating to present a pop-up window in a display area of the computer system;
   obtaining a content area in the display area according to the input message;
   analyzing the content area to generate an analysis content; and
   providing and displaying a value-added content in the pop-up window according to the analysis content;
   wherein the step of analyzing the content area to generate the analysis content comprises:
     preprocessing a plurality of images in the content area and calculating a plurality of characteristic vectors corresponding to the plurality of images; and
     generating the analysis content according to the plurality of characteristic vectors.

2. The value-added content providing method of claim 1, wherein the step of obtaining the content area in the display area according to the input message comprises:
   obtaining an input position and an input time of the input message; and
   obtaining the content area centered on the input position when the input time is greater than a threshold.

3. The value-added content providing method of claim 1, wherein the step of analyzing the content area to generate the analysis content comprises:
   determining a text weight corresponding to each text of a plurality of texts in the content area according to a plurality of distances between the plurality of texts and the input position, and generating the analysis content according to the plurality of texts and text weights thereof.

4. The value-added content providing method of claim 1, wherein the step of providing and displaying the value-added content in the pop-up window according to the analysis content comprises:
   analyzing the analysis content and a database to generate the value-added content, and displaying the value-added content in the pop-up window.

5. A computer system, comprising:
   a display device;
   an input device;
   a processor, coupled to the display device and the input device; and
   a memory, coupled to the processor, configured to store a program code for instructing the processor to execute a value-added content providing method, and the value-added content providing method comprises:
     receiving an input message indicating to present a pop-up window in a display area of the computer system;
     obtaining a content area in the display area according to the input message;
     analyzing the content area to generate an analysis content; and
     providing and displaying a value-added content in the pop-up window according to the analysis content;
     wherein the step of analyzing the content area to generate the analysis content comprises:
       preprocessing a plurality of images in the content area and calculating a plurality of characteristic vectors corresponding to the plurality of images; and
       generating the analysis content according to the plurality of characteristic vectors.

6. The computer system of claim 5, wherein the step of obtaining the content area in the display area according to the input message comprises:
   obtaining an input position and an input time of the input message; and
   obtaining the content area centered on the input position when the input time is greater than a threshold.

7. The computer system of claim 5, wherein the step of analyzing the content area to generate the analysis content comprises:
   determining a text weight corresponding to each text of a plurality of texts in the content area according to a plurality of distances between the plurality of texts and the input position, and generating the analysis content according to the plurality of texts and text weights thereof.

8. The computer system of claim 5, wherein the step of providing and displaying the value-added content in the pop-up window according to the analysis content comprises:
   analyzing the analysis content and a database to generate the value-added content, and displaying the value-added content in the pop-up window.

* * * * *